United States Patent [19]
Kowalski et al.

[11] Patent Number: 6,070,902
[45] Date of Patent: Jun. 6, 2000

[54] VEHICLE INTERIOR HEADLINER SYSTEM

[75] Inventors: Edward L. Kowalski, Rochester Hills; Rakesh Nahta, Canton; Gregg Gibbons, Troy; Brian Cristea, Rochester; Douglas Wilson, Burtchville; Gerald O. Morrison, Beverly Hills, all of Mich.

[73] Assignee: Lear Corporation, Southfield, Mich.

[21] Appl. No.: 09/022,856

[22] Filed: Feb. 12, 1998

[51] Int. Cl.[7] .............................. B60R 21/22; B60R 13/02
[52] U.S. Cl. .................................... 280/730.2; 280/230.1; 296/214
[58] Field of Search ............................. 280/728.2, 730.1, 280/730.2; 296/214; 411/353, 533

[56] References Cited

U.S. PATENT DOCUMENTS

| | | |
|---|---|---|
| 2,834,606 | 5/1958 | Bertrand . |
| 3,733,088 | 5/1973 | Stephenson . |
| 3,774,936 | 11/1973 | Barnett et al. . |
| 3,795,412 | 3/1974 | John . |
| 3,801,126 | 4/1974 | Knight, IV et al. . |
| 3,894,750 | 7/1975 | Eckels . |
| 3,897,961 | 8/1975 | Leising et al. . |
| 3,917,023 | 11/1975 | De Rosa . |
| 4,130,298 | 12/1978 | Shaunnessey . |
| 4,536,008 | 8/1985 | Brown, Jr. . |
| 4,589,809 | 5/1986 | Moore et al. ............................ 411/166 |
| 4,893,866 | 1/1990 | Dowd et al. . |
| 4,902,068 | 2/1990 | Dowd et al. . |
| 4,952,107 | 8/1990 | Dupree .................................... 411/103 |
| 5,105,521 | 4/1992 | Dowd et al. . |
| 5,217,339 | 6/1993 | O'Connor et al. ....................... 411/531 |
| 5,226,672 | 7/1993 | Husted . |
| 5,265,903 | 11/1993 | Kuretake et al. . |
| 5,269,060 | 12/1993 | Dowd et al. . |
| 5,280,991 | 1/1994 | Weiland . |
| 5,333,898 | 8/1994 | Stutz . |
| 5,333,899 | 8/1994 | Witte . |
| 5,362,097 | 11/1994 | Barske . |
| 5,366,241 | 11/1994 | Kithil . |

(List continued on next page.)

FOREIGN PATENT DOCUMENTS

| | | |
|---|---|---|
| 0 705 738 | 4/1996 | European Pat. Off. . |
| 0 791 511 A1 | 8/1997 | European Pat. Off. . |
| 0 795 445 | 9/1997 | European Pat. Off. . |
| 0 798 168 A1 | 10/1997 | European Pat. Off. . |
| 0 810 128 A2 | 12/1997 | European Pat. Off. . |
| 0 812 739 | 12/1997 | European Pat. Off. . |
| 196 22 231 | 12/1997 | Germany . |
| 297 16 574 U | 1/1998 | Germany . |
| 196 32 222 | 2/1998 | Germany . |
| 63064851 | 3/1986 | Japan . |
| 03281454 | 12/1991 | Japan . |
| 06227340 | 8/1994 | Japan . |
| 07117605 | 5/1995 | Japan . |
| 09207701 | 8/1997 | Japan . |
| 10006898 | 1/1998 | Japan . |
| 10109607 | 4/1998 | Japan . |
| 10138856 | 5/1998 | Japan . |
| 10138857 | 5/1998 | Japan . |
| 10138859 | 5/1998 | Japan . |
| 97/35747 | 10/1997 | WIPO . |
| 97/35748 | 10/1997 | WIPO . |

*Primary Examiner*—Paul N. Dickson
*Attorney, Agent, or Firm*—Brooks & Kushman P.C.

[57] ABSTRACT

A vehicle interior headliner system is used in a vehicle having side windows and a roof panel. The headliner system includes a headliner attachable to the roof panel by a self-locating attachment system configured for blind attachment of the headliner to the roof panel. At least one inflatable bladder is secured to the headliner by the self-locating attachment system for deployment along the side windows. At least one inflator assembly is secured to the headliner for inflating the bladder. The self-locating attachment system includes a conical retainer and a floating fastener for blind attachment in a variety of applications.

13 Claims, 6 Drawing Sheets

U.S. PATENT DOCUMENTS

| | | |
|---|---|---|
| 5,433,571 | 7/1995 | Allison . |
| 5,439,247 | 8/1995 | Kolb . |
| 5,458,367 | 10/1995 | Marts et al. . |
| 5,462,308 | 10/1995 | Seki et al. . |
| 5,470,103 | 11/1995 | Vaillancourt et al. . |
| 5,480,181 | 1/1996 | Bark et al. . |
| 5,540,459 | 7/1996 | Daniel . |
| 5,547,219 | 8/1996 | Ha . |
| 5,588,672 | 12/1996 | Karlow et al. . |
| 5,599,042 | 2/1997 | Shyr et al. . |
| 5,602,734 | 2/1997 | Kithil . |
| 5,605,346 | 2/1997 | Cheung et al. . |
| 5,607,180 | 3/1997 | Kornhauser . |
| 5,624,151 | 4/1997 | Guswiler . |
| 5,636,891 | 6/1997 | Van Order et al. . |
| 5,653,464 | 8/1997 | Breed et al. . |
| 5,660,414 | 8/1997 | Karlow et al. . |
| 5,707,075 | 1/1998 | Kraft et al. . |
| 5,718,449 | 2/1998 | Numazawa et al. . |
| 5,740,598 | 4/1998 | Sauve . |
| 5,752,713 | 5/1998 | Matsuura et al. . |
| 5,755,457 | 5/1998 | Specht . |
| 5,775,726 | 7/1998 | Timothy et al. . |
| 5,791,683 | 8/1998 | Shibata et al. ........................ 280/730.2 |
| 5,823,611 | 10/1998 | Daniel et al. . |
| 5,876,084 | 3/1999 | Smith et al. ........................... 296/39.1 |
| 5,884,937 | 3/1999 | Yamada ................................ 280/730.2 |
| 5,921,575 | 7/1999 | Kretschmer et al. ................ 280/728.2 |

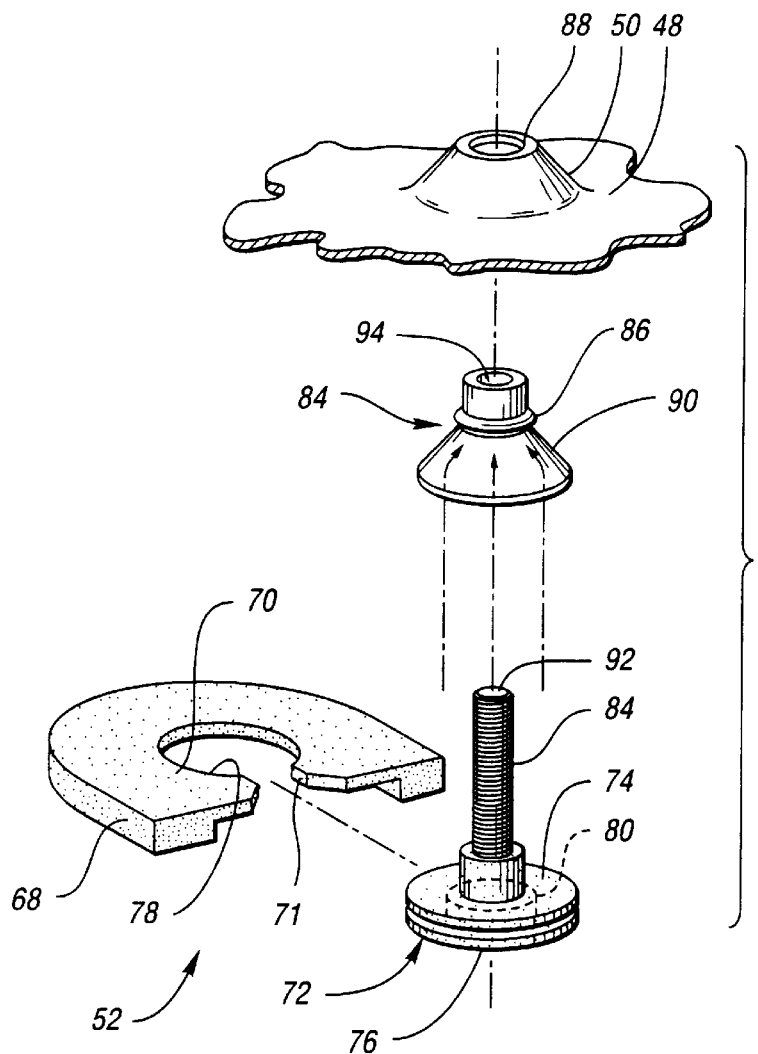
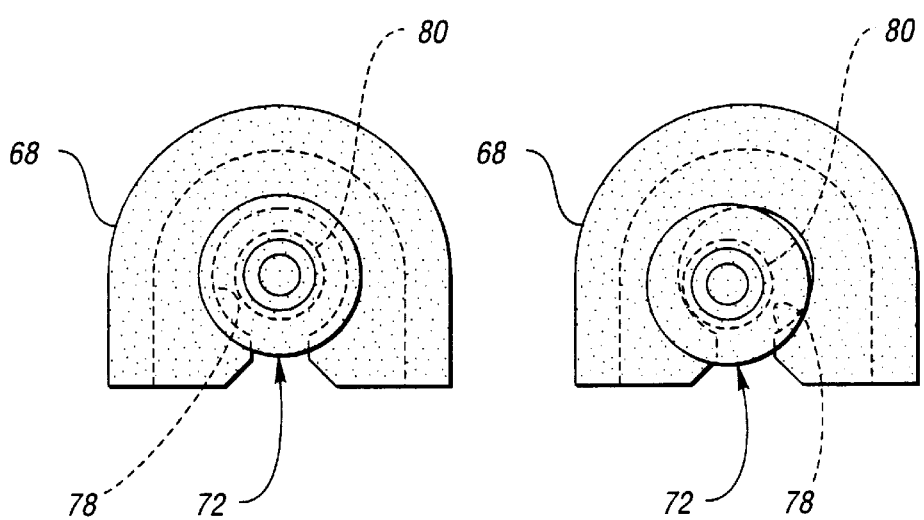

VEHICLE INTERIOR HEADLINER SYSTEM

TECHNICAL FIELD

The present invention relates to a vehicle interior headliner system, and more particularly to a headliner with an inflatable air bag bladder secured to the headliner by a self-locating attachment system configured for blind attachment of the headliner to the roof panel.

BACKGROUND OF THE INVENTION

Known prior art vehicle interior roof-mounted air bag systems are typically impractical and not aesthetically acceptable for current vehicle designs.

In U.S. Pat. No. 2,834,606 to Bertrand, air bag inflators are mounted to the interior roof, and the air bag bladders are deployed from the inflators. In the configuration described, mounting the air bag inflators and bladders on the vehicle interior roof is aesthetically undesirable, particularly in current vehicle designs.

It has been proposed to mount the air bag inflators for an air bag deployment system within the "A" pillar or "B" pillar of the vehicle. However, such mounting of the inflator assembly within an "A" pillar or "B" pillar is undesirable because it generally requires the pillar to be larger in cross-section, which may adversely affect vehicle body design.

It is desirable to provide a vehicle interior air bag deployment system in which an air bag and inflator are mounted for air bag deployment along the side windows of the vehicle between the "A" pillar and "C" pillar, and in which the inflator assembly and bladder assembly are efficiently packaged in the vehicle to satisfy functional and aesthetic requirements of vehicle interior designs.

It is also desirable to provide a self-locating retainer which is useful in blind attachment of components, such as attachment of a headliner onto a vehicle roof.

DISCLOSURE OF THE INVENTION

The present invention provides a self-locating attachment system which overcomes the above-referenced shortcomings of prior art systems by enabling a headliner to support an air bag deployment system. The self-locating attachment system is configured to allow blind attachment of the headliner and air bag assembly to the roof panel. An air bag inflator assembly is secured to the headliner and positioned behind an overhead console for aesthetic reasons.

More specifically, one aspect of the invention provides a vehicle interior headliner system for use in a vehicle having side windows and a roof panel. The headliner system includes a headliner and a self-locating attachment system configured for blind attachment of the headliner to the roof panel. At least one inflatable bladder is secured to the headliner by the self-locating attachment system for deployment along the side windows. At least one inflator assembly is secured to the headliner for inflating the bladder. Preferably, the inflator assembly is hidden behind an overhead console for aesthetic reasons.

In a preferred embodiment, the self-locating attachment system includes a plurality of at least partially conical retainers attachable to the roof panel, and a plurality of housings secured to the headliner. Each housing includes a fastener slidably retained within the housing for lateral sliding movement with respect to the housing. Each fastener includes a portion extending from the housing for engagement within the respective conical retainer to facilitate blind fastening of the headliner to the roof panel.

Another aspect of the invention provides an attachment system for blind attachment of a first member to a second member. The attachment system includes an at least partially conical retainer attachable to the second member. A housing is attachable to the first member, and includes a fastener slidably retained therein for lateral sliding movement with respect to the housing. Each fastener includes a portion extending from the housing for engagement within the respective conical retainer. Accordingly, the fastener may float with respect to the housing, and thereby self-locate as it is guided into position by the conical retainer, even when the conical retainer is not visible to the installer.

Accordingly, an object of the invention is to provide a vehicle interior headliner system in which an air bag bladder and inflator assembly are installed in the vehicle integrally with the headliner.

A further object of the invention is to provide a self-locating attachment system configured for blind attachment of a headliner to a roof panel, or for other like attachment.

Yet another object of the invention is to provide a vehicle interior headliner system in which the air bag inflator assembly is hidden behind an overhead console for aesthetic purposes.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 5 shows an exploded perspective view of a self-locating retainer in accordance with the invention;

FIG. 6 shows a plan view of a housing and fastener in accordance with the present invention;

FIG. 7 shows a plan view of the housing and fastener of FIG. 6, with the fastener in a slightly offset position;

DETAILED DESCRIPTION OF THE PREFERRED EMBODIMENT

Figure 1:
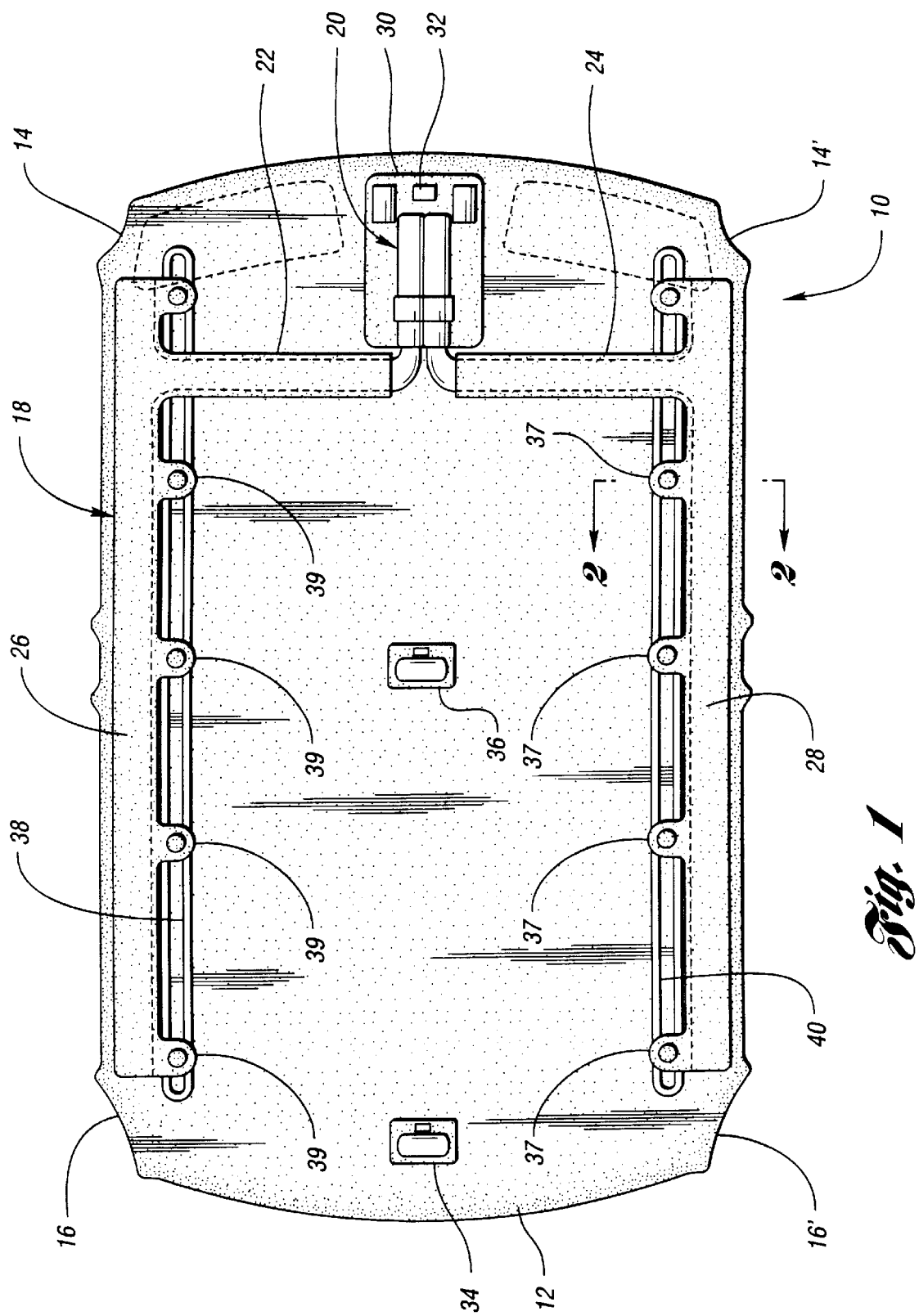
FIG. 1 shows a schematically arranged plan view of a vehicle interior headliner system in accordance with the present invention.

Referring to FIG. 1, a vehicle interior headliner system 10 is shown in accordance with the present invention. The vehicle interior headliner system 10 includes a headliner 12 which is attachable to a vehicle roof panel. When attached, the corners 14,14' and 16,16' are aligned with the "A" pillar and "C" pillar of the vehicle, respectively. The headliner 12 is preferably 100% PET material, but of course the invention is applicable for use with any headliner.

The headliner 12 supports a head impact protection system 18, which includes the inflator assembly 20, manifolds 22,24 and air bladders 26,28.

The inflator assembly 20 is supported on the headliner 12 behind the overhead console 30 for aesthetic reasons. By mounting the inflator assembly 20 directly onto the headliner 12, installation is greatly simplified because the inflator assembly 20 is simply installed with the headliner 12, and hidden by the overhead console 30. This is advantageous over mounting the inflator assembly in the "A" pillar because it does not affect body design.

A self-docking electronics attachment 32 provides electrical communication with the inflator assembly 20 and the overhead light structures 34,36. The self-locating electronics attachment 32 automatically engages as the headliner 12 is installed on the roof panel.

The air bag bladders 26,28 are secured to the headliner 12 by the injection molded tracks 38,40, which each include a plurality of attachment housings 37,39 secured thereon along the length of the respective track 38,40. The tracks 38,40 are preferably glued to the headliner 12.

Figure 2:
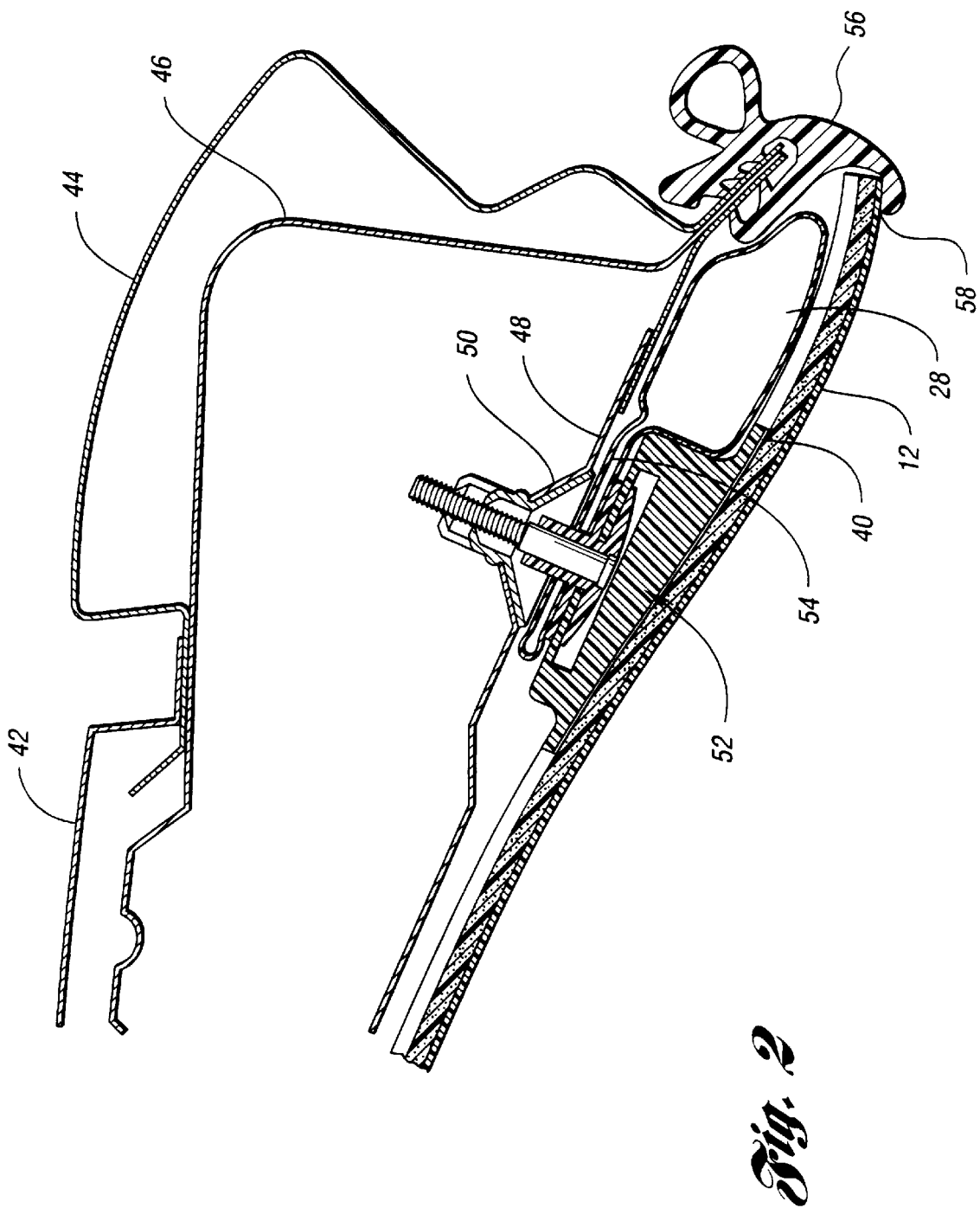
FIG. 2 shows a sectional view taken at line 2—2 of FIG. 1.

Turning to FIG. 2, a sectional view taken at line 2—2 of FIG. 1 is shown. This view shows the attachment of the headliner and air bag assembly to the vehicle roof. As shown, the roof assembly includes an outer roof 42, a side rail outer panel assembly 44, a roof reinforcement panel assembly 46, and a side rail inner panel assembly 48. The side rail inner panel assembly 48 includes a conical opening 50 formed therein for receiving the self-locating attachment system 52 for mounting the headliner 12 and air bag bladder 28 to the side rail inner panel 48.

Figure 3:
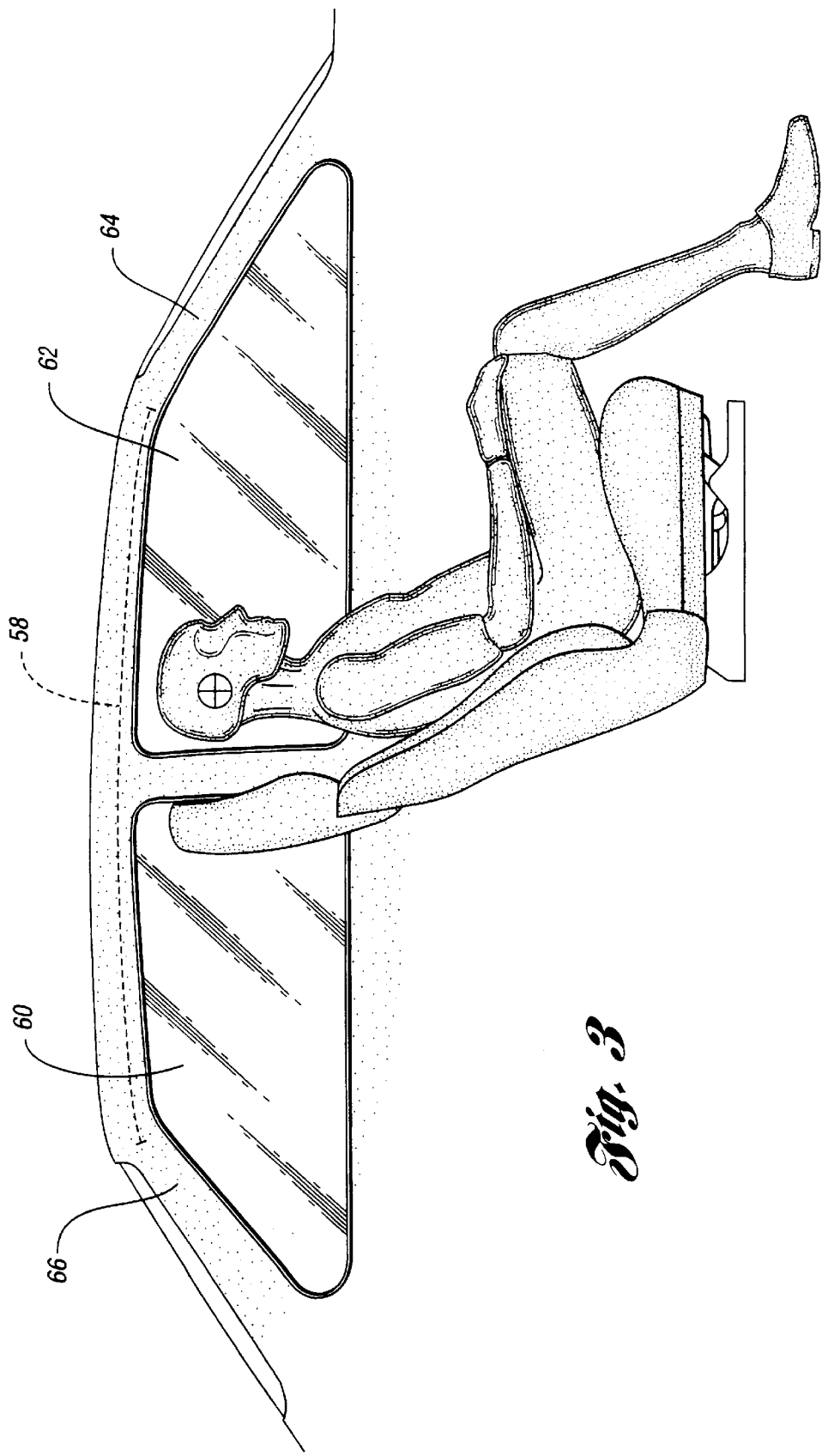
FIG. 3 shows a schematically arranged side view of a vehicle interior headliner system within a vehicle in accordance with the invention.
Figure 4:
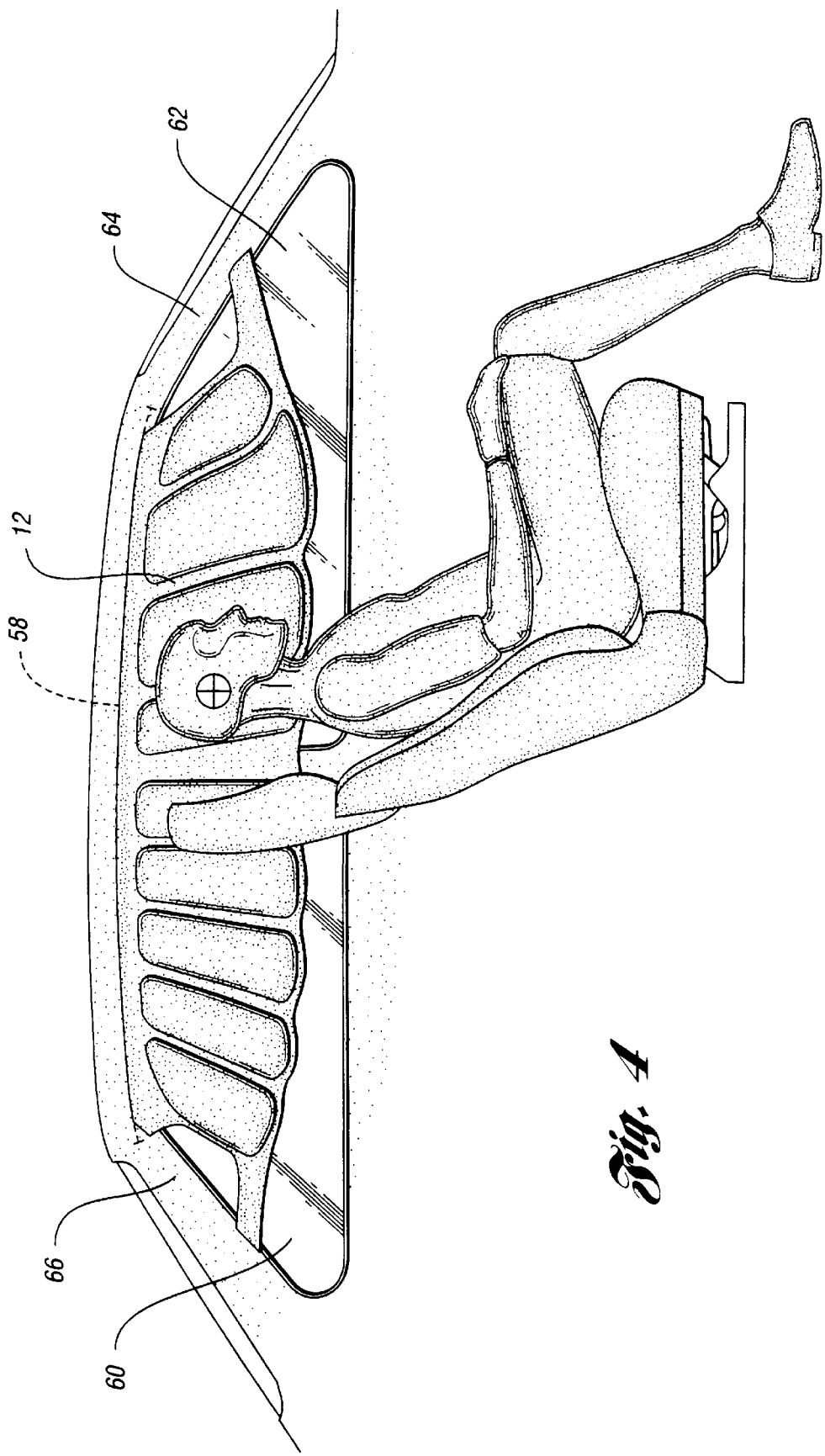
FIG. 4 shows the vehicle interior headliner system of FIG. 3 with the air bag deployed.

As shown, the air bag bladder 28 includes a flap portion 54 which is secured by the self-locating attachment system 52, described below, to the side rail inner panel assembly (roof panel) 48. The air bag bladder 28 is positioned to deploy through the weatherstrip 56 along the seam 58, as shown in FIG. 3, for deployment along the side windows 60,62, as shown in FIG. 4. Accordingly, the air bag 12, when deployed, extends between the "A" pillar 64 and "C" pillar 66 of the vehicle.

Turning to FIGS. 5–9, the self-locating attachment system 52 is more clearly shown. The self-locating attachment system 52 includes a plurality of housings 68, one of which is shown in FIG. 5, which are secured to the plastic tracks 38,40, shown in FIG. 1. Returning to FIG. 5, each housing 68 includes a generally C-shaped flange 70 for slidably receiving a fastener 72. The fastener 72 is installed through the slot 71 into the central opening 78 of the housing 68. The fastener 72 includes first and second opposing generally planar members 74,76, which capture the flange 70 therebetween. The fastener 72 is accordingly slidable around within the housing 68 by movement of the fastener 72 along the flange 70.

This lateral sliding action of the fastener 72 with respect to the housing 68 is more clearly shown in FIGS. 6 and 7. The opening 78 formed by the C-shaped flange 70 is larger in diameter than the central portion 80 of the fastener 72. Therefore, the fastener 72 is free to slide around laterally on the housing 68, as restricted by the central portion 80 abutting the periphery of the opening 78.

The fastener 72 includes a threaded screw 82 extending therefrom for engagement within the conical retainer 84. The conical retainer 84 has an enlarged neck portion 86 which is engageable upon the top 88 of the conical opening 50 formed in the sheet metal 48 to secure the retainer 84 within the sheet metal 48.

The self-locating feature of the attachment system 52 is achieved by the conical wall 90 of the retainer 84. When the screw 82 is inserted into the retainer 84, the top 92 of the screw 82 engages the conical wall 90. As the screw is moved into the retainer 94, the screw top 92 moves along the conical wall 90, which causes the fastener 72 to slide laterally within the housing 68 so that the screw 82 is properly aligned with the hole 94 in the retainer 84 for attachment.

Figure 8:
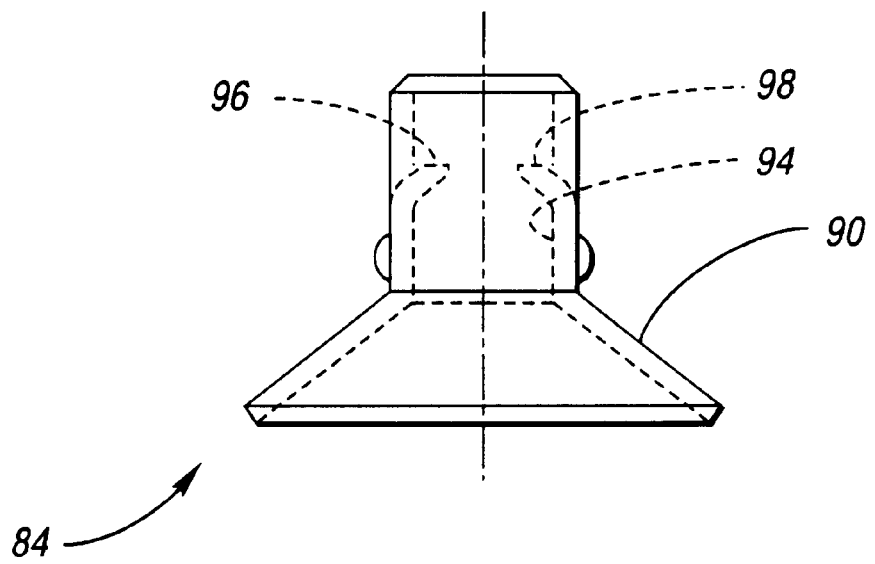
FIG. 8 shows a side view of the conical retainer of the present invention.
Figure 9:
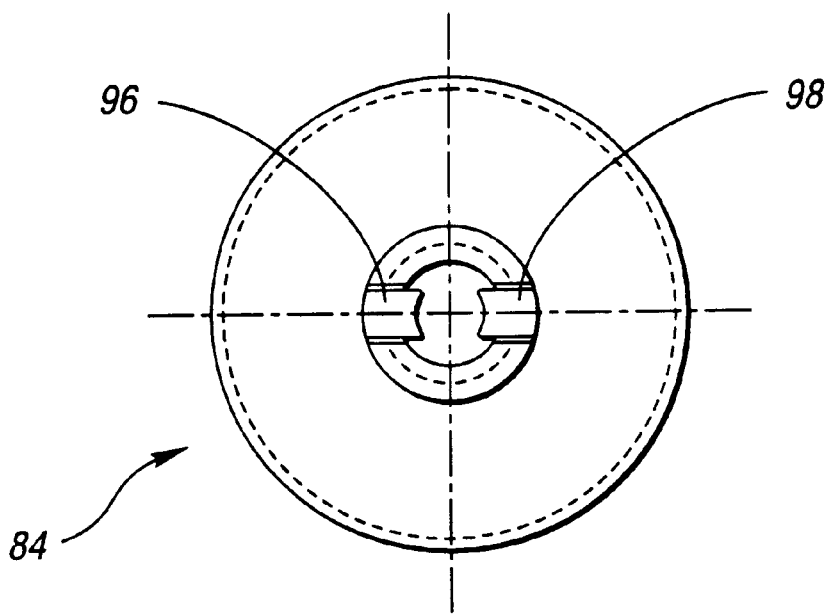
FIG. 9 shows a plan view of the retainer of FIG. 8.

Turning to FIGS. 8 and 9, the retainer 84 includes a pair of flexible teeth 96,98 which are configured to engage with the threads of the screw 82. As the screw 82 is inserted through the hole 94 in the fastener 84, the teeth 96,98 flex upward to allow insertion of the screw, but prevent return movement of the threaded screw 82 back out of the retainer 84 because of the angled configuration of the teeth 96,98.

This self-locating attachment system 52 is useful in a variety of applications because the conical retainer 84 compensates for misalignment, and the fastener 72 floats within the housing 68 to properly align the screw 82 for attachment, even when the conical retainer 84 is not visible to the installer, such as in the installation of a headliner assembly.

While the best mode for carrying out the invention has been described in detail, those familiar with the art to which this invention relates will recognize various alternative designs and embodiments for practicing the invention within the scope of the appended claims.

What is claimed is:

1. A vehicle interior headliner system for use in a vehicle having side windows and a roof panel, the system comprising:

a headliner attachable to the roof panel and having opposing edges to be positioned along the side windows;

at least one inflatable bladder secured to the headliner along at least one of said edges for deployment lengthwise along at least one of the side windows to substantially cover the side windows;

at least one inflator assembly secured to the headliner for inflating said at least one bladder; and an overhead console secured to the headliner adjacent said inflator assembly for hiding said inflator assembly therebehind.

2. The vehicle interior headliner system of claim 1, further comprising:

a plurality of at least partially conical retainers attachable to the roof panel;

a plurality of housings secured to the headliner and each having a fastener slidably retained within the respective housing for lateral sliding movement with respect to the housing, each fastener having a portion extending from the housing for engagement within the respective conical retainer;

wherein said conical retainers cooperate within said slidable fasteners to align the fasteners for attachment to the retainers by causing lateral sliding movement of the fasteners within the respective housings to facilitate blind attachment of the headliner to the roof panel; and first and second plastic tracks securing said plurality of housings to the headliner.

3. The vehicle interior headliner system of claim 2, wherein each said housing comprises a generally C-shaped flange, and each said fastener comprises first and second opposing generally planar members capturing said flange therebetween and slidable against said flange.

4. The vehicle interior headliner system of claim 3, wherein each said fastener further comprises a threaded screw extending therefrom to form said portion extending from the housing for engagement within the respective conical retainer.

5. The vehicle interior headliner system of claim 4, wherein each said retainer comprises a flexible tooth for engagement with the respective threaded screw.

6. The vehicle interior headliner system of claim 1, further comprising an inflation manifold extending from the inflator assembly to the inflatable bladder.

7. A vehicle interior headliner system for use in a vehicle having side windows and a roof panel, the headliner system comprising:

a headliner attachable to the roof panel;

a self-locating attachment system configured for blind attachment of the headliner to the roof panel including a plurality of at least partially conical retainers attachable to one of the headliner and the roof panel, and a plurality of housings secured to the other of the headliner and the roof panel and each having a fastener slidably retained within the respective housing for lateral sliding movement with respect to the housing, each fastener having a portion extending from the housing for engagement within the respective conical retainer;

at least one inflatable bladder secured to the headliner by said self-locating attachment system for deployment along the side windows; and at least one inflator assembly secured to the headliner for inflating said at least one bladder.

8. The vehicle interior headliner system of claim 7, further comprising an overhead console secured to the headliner for hiding said at least one inflator assembly therebehind.

9. The vehicle interior headliner system of claim 8, further comprising first and second plastic tracks securing said plurality of housings to the headliner.

10. The vehicle interior headliner system of claim 9, wherein each said housing comprises a generally C-shaped flange, and each said fastener comprises first and second opposing generally planar members capturing said flange therebetween and slidable against said flange.

11. The vehicle interior headliner system of claim 10, wherein each said fastener further comprises a threaded screw extending therefrom to form said portion extending from the housing for engagement within the respective conical retainer.

12. The vehicle interior headliner system of claim 11, wherein each said retainer comprises a flexible tooth for engagement with the respective threaded screw.

13. The vehicle interior headliner system of claim 7, further comprising an inflation manifold extending from the inflator assembly to the inflatable bladder.

* * * * *